US009473305B2

(12) United States Patent
Pizano

(10) Patent No.: US 9,473,305 B2
(45) Date of Patent: *Oct. 18, 2016

(54) COMPUTER PROGRAM AND METHOD FOR BIOMETRICALLY SECURED, TRANSPARENT ENCRYPTION AND DECRYPTION

(71) Applicant: Ceelox Patents, LLC, Overland Park, KS (US)

(72) Inventor: Erix Pizano, Tampa, FL (US)

(73) Assignee: Ceelox Patents, LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/922,769

(22) Filed: Oct. 26, 2015

(65) Prior Publication Data

US 2016/0204943 A1 Jul. 14, 2016

Related U.S. Application Data

(63) Continuation of application No. 14/451,075, filed on Aug. 4, 2014, now Pat. No. 9,172,700, which is a continuation of application No. 13/867,832, filed on Apr. 22, 2013, now Pat. No. 8,799,407, which is a (Continued)

(51) Int. Cl.
| | |
|---|---|
| *G06F 15/16* | (2006.01) |
| *H04L 9/32* | (2006.01) |
| *H04L 29/06* | (2006.01) |
| *G06F 21/62* | (2013.01) |
| *G06F 21/60* | (2013.01) |

(52) U.S. Cl.
CPC ........... *H04L 9/3242* (2013.01); *G06F 21/602* (2013.01); *G06F 21/6218* (2013.01); *G06F 21/6245* (2013.01); *H04L 63/06* (2013.01); *H04L 63/0861* (2013.01); *G06F 2221/2107* (2013.01); *H04L 63/0428* (2013.01)

(58) Field of Classification Search
CPC ... H04L 63/20; H04L 63/062; H04L 63/061; H04L 63/0823; G06F 21/62; G06F 21/72; G06F 2221/2149; G06F 15/16
USPC .................................. 709/217, 224; 370/292
See application file for complete search history.

(56) References Cited

U.S. PATENT DOCUMENTS

| | | | | |
|---|---|---|---|---|
| 6,347,374 B1 * | 2/2002 | Drake | ................... | G06F 21/554 709/224 |
| 7,278,028 B1 * | 10/2007 | Hingoranee | ............ | G06F 21/32 713/161 |
| 7,299,067 B2 * | 11/2007 | Riggs | ..................... | H04L 63/08 370/292 |
| 7,474,769 B1 * | 1/2009 | McAfee, II | ........ | G06K 9/00087 348/E7.056 |

(Continued)

*Primary Examiner* — Tesfay Yohannes
(74) *Attorney, Agent, or Firm* — Erise IP, P.A.

(57) ABSTRACT

A computer program for enabling secured, transparent encryption and decryption provides a user interface that allows a user to drag and drop files into and out of a secure repository and automatically encrypts files transferred into the repository and automatically decrypts files transferred out of the repository. The user can transfer file folders into the repository, wherein the program encrypts all of the files within the folder and retains the original file/folder structure, such that individual files can be moved within the repository, moved out of the repository, and opened or executed directly from the repository. The program requires the user to submit biometric data and grants access to the secure repository only if the biometric data is authenticated. The program generates an encryption key based at least in part on biometric data received from the user. Additionally, the program destroys the key after termination of each encryption/decryption session.

17 Claims, 8 Drawing Sheets

Related U.S. Application Data continuation of application No. 13/285,641, filed on Oct. 31, 2011, now Pat. No. 8,429,246, which is a continuation of application No. 12/906,826, filed on Oct. 18, 2010, now Pat. No. 8,051,142, which is a continuation of application No. 11/549,206, filed on Oct. 13, 2006, now Pat. No. 7,818,395, which is a continuation-in-part of application No. 13/153,906, filed on Jun. 6, 2011, now Pat. No. 8,627,106, which is a continuation of application No. 11/380,810, filed on Apr. 28, 2006, now Pat. No. 7,962,755.

(56) References Cited

U.S. PATENT DOCUMENTS

| | | | |
|---|---|---|---|
| 7,813,822 B1* | 10/2010 | Hoffberg | G06K 9/00369 381/73.1 |
| 2003/0163739 A1* | 8/2003 | Armington | G06F 21/32 726/3 |
| 2004/0066533 A1* | 4/2004 | Nakajima | H04N 1/2112 358/1.15 |
| 2005/0018883 A1* | 1/2005 | Scott | G06Q 20/382 382/115 |

* cited by examiner

| Volume | Vault Folder | Host Computer Folder (Full Path) | Pair Name | Order of Execution |
|---|---|---|---|---|
| Flash Drive | FlashPics | F:\MyPics | FlashPics | 1 |
| Laptop HDD | LaptopPics | C:\Docs\1\MyPics | LaptopPics | 2 |
| Network Drive | NetworkPics | K:\Personal\MyPics | NetworkPics | 3 |

COMPUTER PROGRAM AND METHOD FOR BIOMETRICALLY SECURED, TRANSPARENT ENCRYPTION AND DECRYPTION

RELATED APPLICATIONS

This application is a continuation, and claims priority benefit with regard to all common subject matter, of U.S. patent application Ser. No. 14/451,075, filed Aug. 4, 2014, entitled "COMPUTER PROGRAM AND METHOD FOR BIOMETRICALLY SECURED, TRANSPARENT ENCRYPTION AND DECRYPTION," which is now U.S. Pat. No. 9,172,700, issued Oct. 27, 2015 ("the '700 Patent"). The '700 Patent is a continuation, and claims priority benefit with regard to all common subject matter, of U.S. patent application Ser. No. 13/867,832, filed Apr. 22, 2013, entitled "COMPUTER PROGRAM AND METHOD FOR BIOMETRICALLY SECURED, TRANSPARENT ENCRYPTION AND DECRYPTION," which is now U.S. Pat. No. 8,799,407, issued Aug. 5, 2014 ("the '407 Patent"). The '407 Patent is a continuation, and claims priority benefit with regard to all common subject matter, of U.S. patent application Ser. No. 13/285,641, filed Oct. 31, 2011, entitled "COMPUTER PROGRAM AND METHOD FOR BIOMETRICALLY SECURED, TRANSPARENT ENCRYPTION AND DECRYPTION," which is now U.S. Pat. No. 8,429,246, issued Apr. 23, 2013 ("the '246 Patent"). The '246 Patent is a continuation, and claims priority benefit with regard to all common subject matter, of U.S. patent application Ser. No. 12/906,826, filed Oct. 18, 2010, entitled "COMPUTER PROGRAM AND METHOD FOR GRANTING MULTIPLE USERS ACCESS TO A SECURE REPOSITORY," which is now U.S. Pat. No. 8,051,142, issued Nov. 1, 2011 ("the '142 Patent"). The '142 Patent is a continuation, and claims priority benefit with regard to all common subject matter, of U.S. patent application Ser. No. 11/549,206, filed Oct. 13, 2006, entitled "METHOD AND APPARATUS FOR INTERFACING WITH A RESTRICTED ACCESS COMPUTER SYSTEM," which is now U.S. Pat. No. 7,818,395, issued Oct. 19, 2010. The '246 Patent is also a continuation-in-part, and claims priority benefit with regard to all common subject matter, of U.S. patent application Ser. No. 13/153,906, filed Jun. 6, 2011, entitled "SYSTEM AND METHOD FOR BIOMETRICALLY SECURED, TRANSPARENT ENCRYPTION AND DECRYPTION," which is now U.S. Pat. No. 8,627,106, issued Jan. 7, 2014 ("the '106 Patent"). The '106 Patent is a continuation of U.S. patent application Ser. No. 11/380,810, filed Apr. 28, 2006, entitled "SYSTEM AND METHOD FOR BIOMETRICALLY SECURED, TRANSPARENT ENCRYPTION AND DECRYPTION," which is now U.S. Pat. No. 7,962,755, issued Jun. 14, 2011. The above-identified earlier-filed patents are hereby incorporated by reference in their entirety into the present application.

BACKGROUND OF THE INVENTION

1. Field of the Invention

Embodiments of the present invention relate to computer peripheral devices and methods of dynamically interfacing peripheral devices with a host computer. More particularly, embodiments of the invention involve a computer peripheral device and associated software for use with a restricted-access computer programmed to prevent users from installing and removing software. Embodiments of the invention further involve a system and method for transparently encrypting and decrypting digital data, wherein the encryption and decryption is managed in a biometrically secured process.

2. Description of Prior Art

Computer peripheral devices are commonly configured to be connected to and removed from computers "on the fly," or without interrupting operation of a host computer. Such devices are commonly referred to as "plug-and-play" devices. When a user connects the device to a host computer, the computer automatically identifies the device and determines whether the computer is able to interact with the device using software already installed on the computer. For example, the computer may search a list of drivers included in the operating system to determine whether any of the drivers is compatible with the peripheral device. If not, the host computer may prompt the user to submit a driver associated with the device, may search the Internet for a compatible device driver, or both.

Computer operating systems can be configured for restricted use, wherein the operating system allows users to access the computer and use applications already installed on the computer, but prevent users from installing new software on the computer, removing software from the computer, or otherwise changing computer settings. In the MICROSOFT WINDOWS™ operating system, for example, all users except those with administrative privileges may be required to use the computer in the restricted mode.

Unfortunately, such restricted operating environments can limit the usefulness of plug-and-play devices because restricted operating environments prevent users from installing device drivers that may be necessary to enable the computer to interact with a device. For example, a user may store data files on an external hard drive and physically transport the hard drive to a restricted access computer with the intent of accessing the data files from the computer. If the hard drive requires a software driver that is not already installed on the computer, however, the user will not be able to access the hard drive, even if the user has the driver, because the restricted-access computer will not permit the user to install the driver on the computer.

Accordingly, there is a need for an improved computer peripheral device and method of interfacing with a restricted-use computer that does not suffer from the problems and limitations of the prior art.

SUMMARY OF THE INVENTION

Embodiments of the present invention provide improved computer peripheral devices and methods of dynamically interfacing peripheral devices with a host computer that do not suffer from the problems and limitations of the prior art. Particularly, embodiments of the present invention provide a computer peripheral device and associated software for use with a restricted-access computer programmed to prevent users from installing and removing software.

According to a first embodiment, the invention is an apparatus for interfacing with a restricted access computer. The apparatus comprises a peripheral component and an interface controller. The interface controller enables communication between the peripheral component and a computer, and communicates data to the computer indicating to the computer that the computer is operable to interact with the apparatus using software already installed on the computer.

The apparatus further comprises a computer program comprising a first code segment for enabling the computer to interact with the peripheral component, and a second code segment discoverable by the computer for enabling the computer to execute the first code segment directly from the apparatus without installing the first code segment on the computer.

A second embodiment of the invention is a system for interfacing with a restricted access computer. The system comprises a restricted access computer and an apparatus for interfacing with the computer. The apparatus comprises a data storage component, a user interface component, and an interface controller. The interface controller enables communication between the data storage component and the computer and between the user interface component and the computer, and communicates data to the computer identifying the apparatus as a device that the computer is operable to interact with using software already installed on the computer. A computer program is stored on the data storage component, wherein the computer program comprises a first code segment for enabling the computer to interact with the user interface component, and a second code segment for enabling the computer to execute the first code segment directly from the data storage component without installing any program code on the computer.

A third embodiment of the invention is an apparatus for interfacing with a restricted access computer system. The apparatus comprises a data storage component, a biometric sensor, and an interface controller. The interface controller enables electronic communication between the data storage component and a host computer and between the biometric sensor and the host computer. The interface controller includes a circuit operable to communicate data to the host computer, the data indicating to the computer that the computer is operable to interact with the peripheral component using software already installed on the computer.

A computer program is stored on the data storage component, the computer program comprising a first code segment for enabling the host computer to generate a user interface using only data that is stored on the data storage component, and a second code segment for enabling the host computer to interact with the biometric sensor. A third code segment of the computer program is automatically discoverable by the host computer and recognized by the host computer as a code segment to be automatically executed by the host computer upon discovery. The third code segment enables the host computer to execute the first and second code segments without installing the first code segment or the second code segment on the host computer.

A fourth embodiment of the invention is a method of interfacing an apparatus with a restricted-access computer. The method comprises connecting the apparatus to the computer, the apparatus including a peripheral component, and communicating data from the apparatus to the computer indicating to the computer that the computer is operable to interact with the apparatus using software already installed on the computer. The method further comprises communicating a first code segment from the apparatus to the computer, wherein the first code segment is automatically discoverable by the computer and enables the computer to execute a second code segment stored on the apparatus without installing the second code segment on the computer, the second code segment enabling the computer to interact with the peripheral component.

Embodiments of the invention may further include a computer program for enabling a secure storage system. The computer program comprises a code segment for encrypting a file designated by a user and storing the file in a secure repository, wherein the program encrypts and stores the file in response to the user selecting the file and selecting the repository and with no further action from the user. The program further comprises a code segment for decrypting the file and storing the file in a location external to the repository, wherein the program decrypts and stores the file in response to the user selecting the file from the repository and selecting the external location and with no further action from the user.

These and other important aspects of the present invention are described more fully in the detailed description below.

BRIEF DESCRIPTION OF THE DRAWINGS

Preferred embodiments of the present invention are described in detail below with reference to the attached drawing figures, wherein.

DETAILED DESCRIPTION

The present teachings involve a system and method of transparently encrypting and decrypting data via a biometrically secure process, and an apparatus and method for interfacing with a restricted-access computer. The apparatus enables the restricted-access computer to implement a computer program stored on the apparatus, such as a computer program implementing the system and method of transparently encrypting and decrypting data via a biometrically secure process.

System and Method of Transparent Encryption and Decryption

Figure 1:
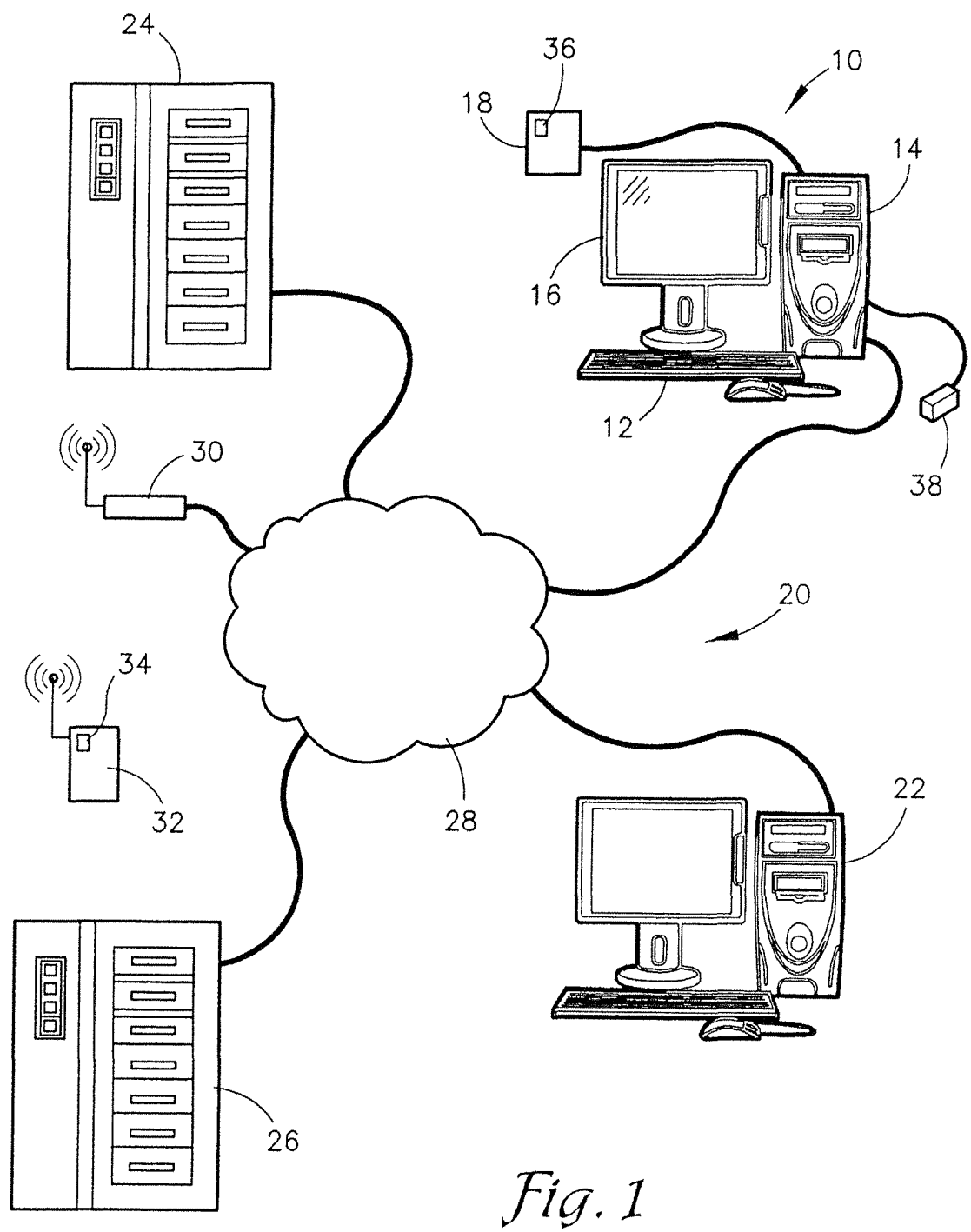
FIG. 1 is a schematic diagram of an exemplary system for implementing a computer program in accordance with an embodiment of the present invention, wherein the program implements a method of secure, transparent data encryption and decryption.

The system and method of transparently encrypting and decrypting data via a biometrically secure process of the present teachings is especially well-suited for implementation on a computer or a computer network, such as the computer 10 illustrated in FIG. 1 that includes a keyboard 12, a processor console 14, a display 16, and one or more peripheral devices 18,38, such as an external data storage device, biometric data sensor, scanner, printer, or a combination thereof. The computer 10 may be a part of a computer network, such as the computer network 20 that includes one or more client computers 10,22 and one or more server computers 24,26 and interconnected via a communications system 28. The present invention may also be implemented, in whole or in part, on a wireless communications system including, for example, a network-based wireless transmitter 30 and one or more wireless receiving devices, such as a hand-held computing device 32 with wireless communication capabilities. The secure storage system may comprise conventional hardware devices enabled by a computer program. The secure storage system will thus be generally described herein in terms of a computer program. It will be appreciated, however, that the principles of the present invention are useful independently of a particular implementation, and that one or more of the steps described herein may be implemented without the assistance of a computing device.

The method of the present teachings can be implemented in hardware, software, firmware, or a combination thereof. In a preferred embodiment, however, the method is implemented with a computer program. The computer program and equipment described herein are merely examples of a program and equipment that may be used to implement the present invention and may be replaced with other software and computer equipment without departing from the scope of the present invention.

The computer program of the present invention is stored in or on a computer-useable medium, such as a computer-readable medium, residing on or accessible by a host computer for instructing the host computer to implement the method of the present invention as described herein. The host computer may be a server computer, such as server computer 24, or a network client computer, such as computer 10. The computer program preferably comprises an ordered listing of executable instructions for implementing logical functions in the host computer and other computing devices coupled with the host computer. The computer program can be embodied in any computer useable medium, such as a computer-readable medium, for use by or in connection with an instruction execution system, apparatus, or device, such as a computer-based system, processor-containing system, or other system that can fetch the instructions from the instruction execution system, apparatus, or device, and execute the instructions.

The ordered listing of executable instructions comprising the computer program of the present invention will hereinafter be referred to simply as "the program" or "the computer program." It will be understood by those skilled in the art that the program may comprise a single list of executable instructions or two or more separate lists, and may be stored on a single computer-useable medium or multiple distinct media. The program will also be described as comprising various "code segments," which may include one or more lists, or portions of lists, of executable instructions. Code segments may include overlapping lists of executable instructions, that is, a first code segment may include instruction lists A and B, and a second code segment may include instruction lists B and C.

In the context of this document, a "computer-useable medium" can be any means that can contain, store, communicate, propagate or transport the program for use by or in connection with the instruction execution system, apparatus, or device. The computer-useable medium can be, for example, but is not limited to, an electronic, magnetic, optical, electro-magnetic, infrared, or semi-conductor system, apparatus, device, or propagation medium. More specific, although not inclusive, examples of computer-useable media would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-useable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

The computer program of the present teachings transparently encrypts data and stores the data in a secure repository by way of a biometrically secure process. A particular secure repository is referred to herein as a "vault." As used in this document, a "vault" includes any computer-useable medium—as described above—that is operable to store data, such as a computer hard drive or other magnetic storage medium. The program automatically encrypts data moved into the vault and decrypts data moved out of the vault so that users can quickly and easily secure sensitive data. The vault is protected by an authentication system that requires biometric data, a password, or both, to gain access to the vault. In one embodiment, the vault resides on a storage medium external to a computer, such as an external hard drive 18 communicating with a host computer 10 via a USB port or an IEEE 1394 port of the host computer, as explained below in the section titled "Apparatus for Interfacing with a Restricted Access Computer."

Figure 2:
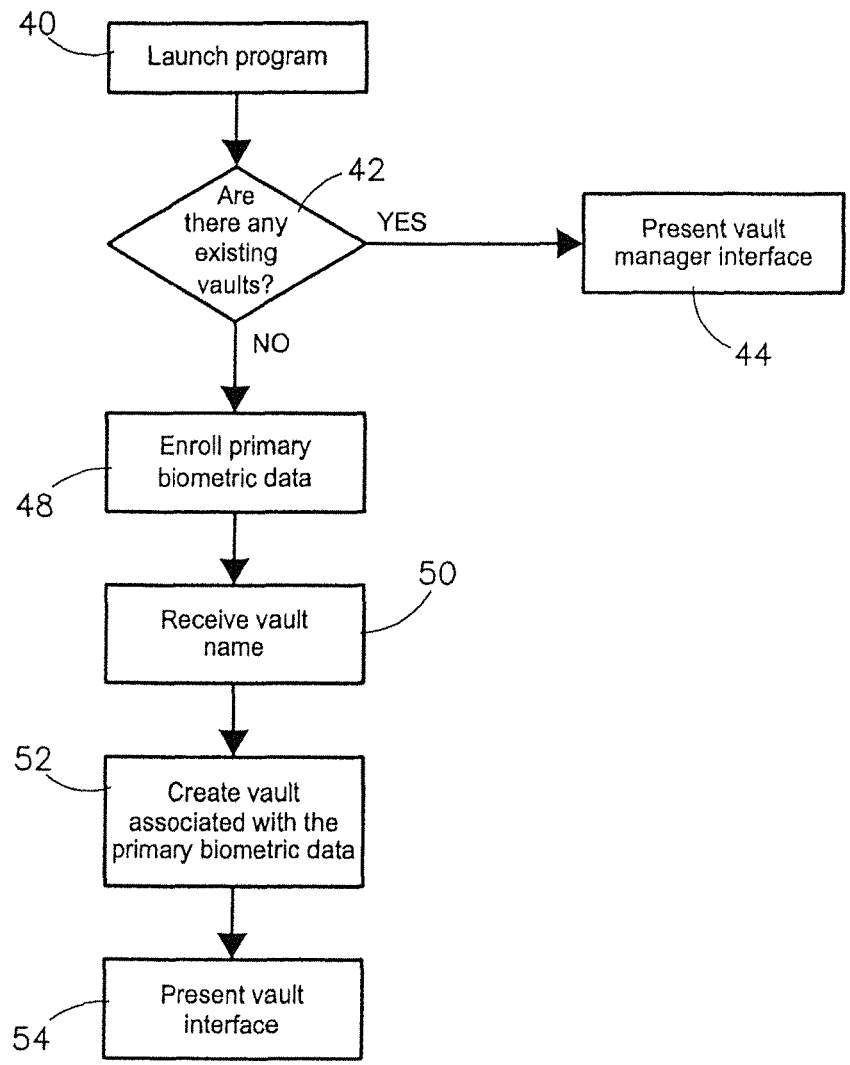
FIG. 2 is a flow diagram of certain steps performed by the computer program when the program is first launched.
Figure 5:
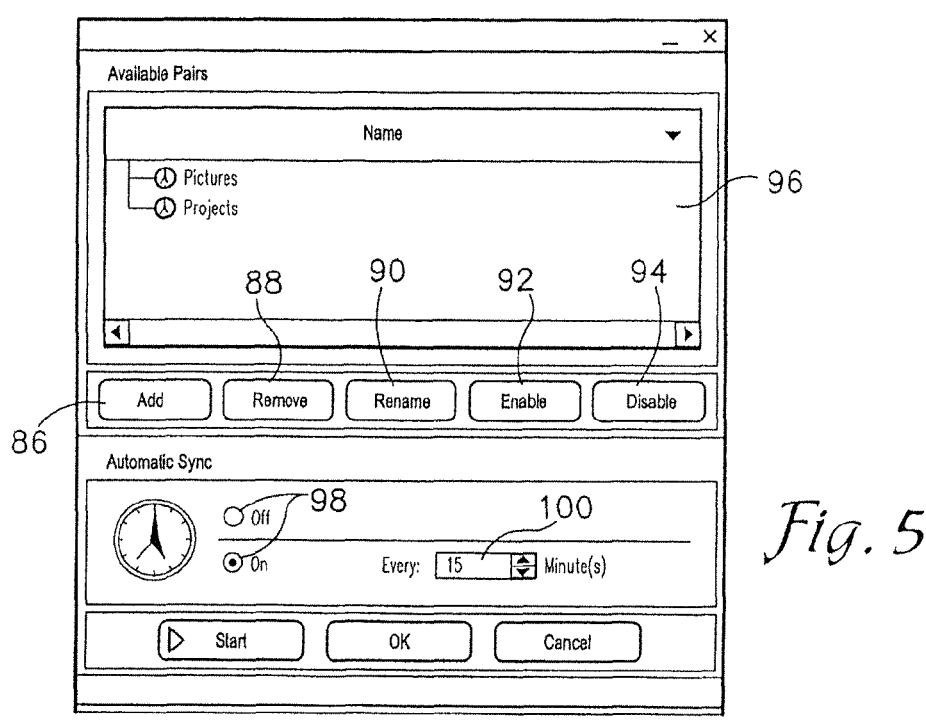
FIG. 5 is an exemplary user interface associated with the computer program for enabling a user to manage a synchronization function of the program.

Referring to FIG. 2, a flow diagram of steps involved in launching the program is illustrated. The program is first launched, as depicted in block 40. The program may be installed on and executed from the computer 10, in which case a user launches the program in a conventional manner, such as by selecting an icon associated with the program. Alternatively, the program may be stored on a medium external to the computer 10 and communicated to the computer 10 to be executed by, but not installed on, the computer 10. In the latter scenario, the program may be automatically discovered and executed by the host computer 10 according to protocols of the computer's operating system. When the program is launched, it first determines whether there are any existing vaults, as depicted in block 42. There may be existing vaults if the program was previously run and created vaults that were saved to a storage device. If the program discovers existing vaults, it presents a vault manager interface (FIG. 5), as depicted in block 44. The vault manager is described in detail below.

If the program does not discover an existing vault, the program begins the process of creating a new vault by enrolling primary biometric data that will be associated with the new vault, as depicted in block 48. The primary biometric data is associated with a primary user, or the user who creates the vault. If the biometric data used by the program is fingerprint data, enrolling the primary data includes scanning a first fingerprint, creating a first primary biometric (fingerprint) template from the first fingerprint, scanning a second fingerprint, and creating a second primary biometric (fingerprint) template from the second fingerprint.

Figure 10:
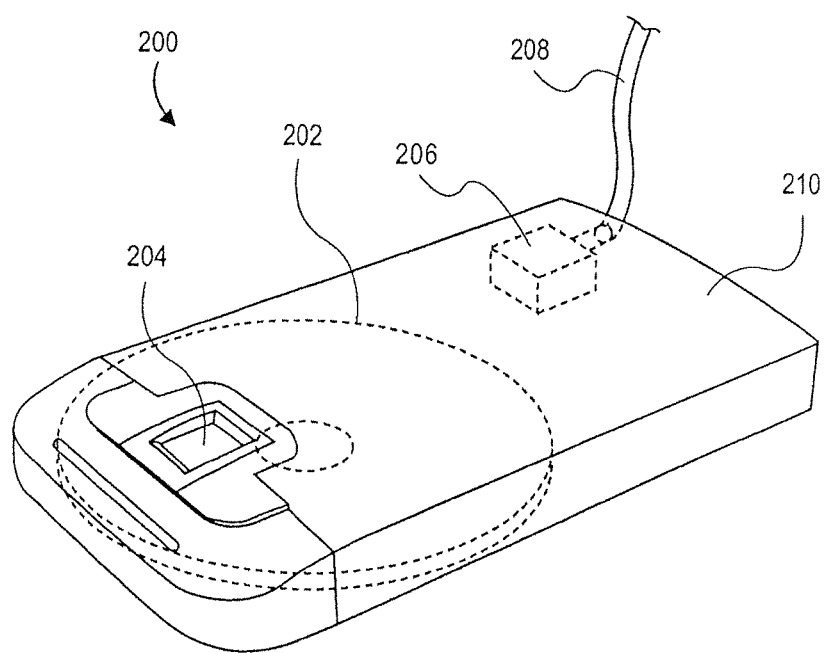
FIG. 10 is an exemplary apparatus for interfacing a restricted access computer of FIG. 1 and enabling the restricted access computer to execute the program.

The computer 10 receives biometric data from a user via a standalone biometric sensor 38, such as a standalone fingerprint scanner, or via a biometric sensor 36 that is housed in another device 18, such as a fingerprint scanner that is built into a hard drive enclosure, sometimes referred to as a "bio drive." An exemplary bio drive is illustrated in FIG. 10.

The program encodes the two biometric templates using, for example, a hashing algorithm that involves fragmenting template data, resorting the fragmented data, and storing the resorted data in a database. The program uses a different hashing algorithm for each vault to ensure that no two vaults have the same hashed template data, even if both vaults were created by the same user. The program destroys the first and second (unhashed) primary biometric templates so that only the hashed template data is stored in a database. The program decodes (unhashes) the encoded template data only if it authenticates a user, as explained below.

The program creates an encryption key using the first and second primary biometric templates and thus must decode the encoded template data to create the encryption key. The encryption key is based at least in part on the templates, and preferably is further based on one or more other elements such as, for example, biometric data received from the user and not included in the templates and/or the unique hashing algorithm associated with the vault. After an encryption or decryption operation, the program destroys the key and the biometric templates, preserving only the encoded template data.

The biometric sensors (36,38) as illustrated and described herein are fingerprint scanners for capturing fingerprint data, but it will be appreciated that substantially any biometric data may be used without departing from the scope of the claimed invention including, but not limited to, voice print data, retinal scan data, iris scan data, facial characteristics, and behavioral characteristics, such as signature data. Such biometric data may be captured and analyzed using conventional hardware and processes known in the art. Furthermore, the biometric data used by the claimed invention may be any combination of one or more types of such biometric data.

The program may alternatively receive and use a password in lieu of the biometric data where, for example, the program is installed on a computer that does not have an associated biometric sensor. When using only a password, the program associates the vault with the password and may use the password to create the encryption key. The program may create an artificial biometric template and use the artificial biometric template as if it were an actual biometric template described above, and may supplement the template with, for example, information taken or derived from the password to create the encryption key. Alternatively, the program may use both biometric data and a password, and may supplement the biometric template with information taken or derived from the password to create the encryption key. In yet another alternative, the program may require the user to submit either biometric information or a password as the user wishes. The program will generally be described below as using biometric data with the understanding that a password may be used in lieu of, or in combination with, the biometric data.

Once the program enrolls the primary biometric data (or password) associated with the vault, the program receives the name of the vault from the user, as depicted in block 50. With the primary biometric data and the name of the vault, the program creates the vault associated with the primary biometric data, as depicted in block 52, and presents a vault interface, as depicted in block 54. The user can then move data files into and out of the vault using the vault interface (FIG. 3), as explained in greater detail below.

At any time during use of the program, the user can choose to enroll secondary biometric data (or a secondary password) to be associated with the vault, wherein the secondary biometric data (or password) is from a second user. The process of enrolling the secondary biometric data may be substantially similar to the process of enrolling the primary biometric data, except that the secondary biometric data is not used to create the encryption key. In enrolling the secondary biometric data, the program receives biometric information from the user, creates one or more biometric templates, and encodes biometric template data. Thereafter, the secondary user is authenticated when he or she submits the biometric data, the program encodes the biometric data and matches the encoded biometric data with encoded biometric data stored in the database. Any number of secondary users may submit secondary data to enable them to gain access to the vault.

Figure 3:
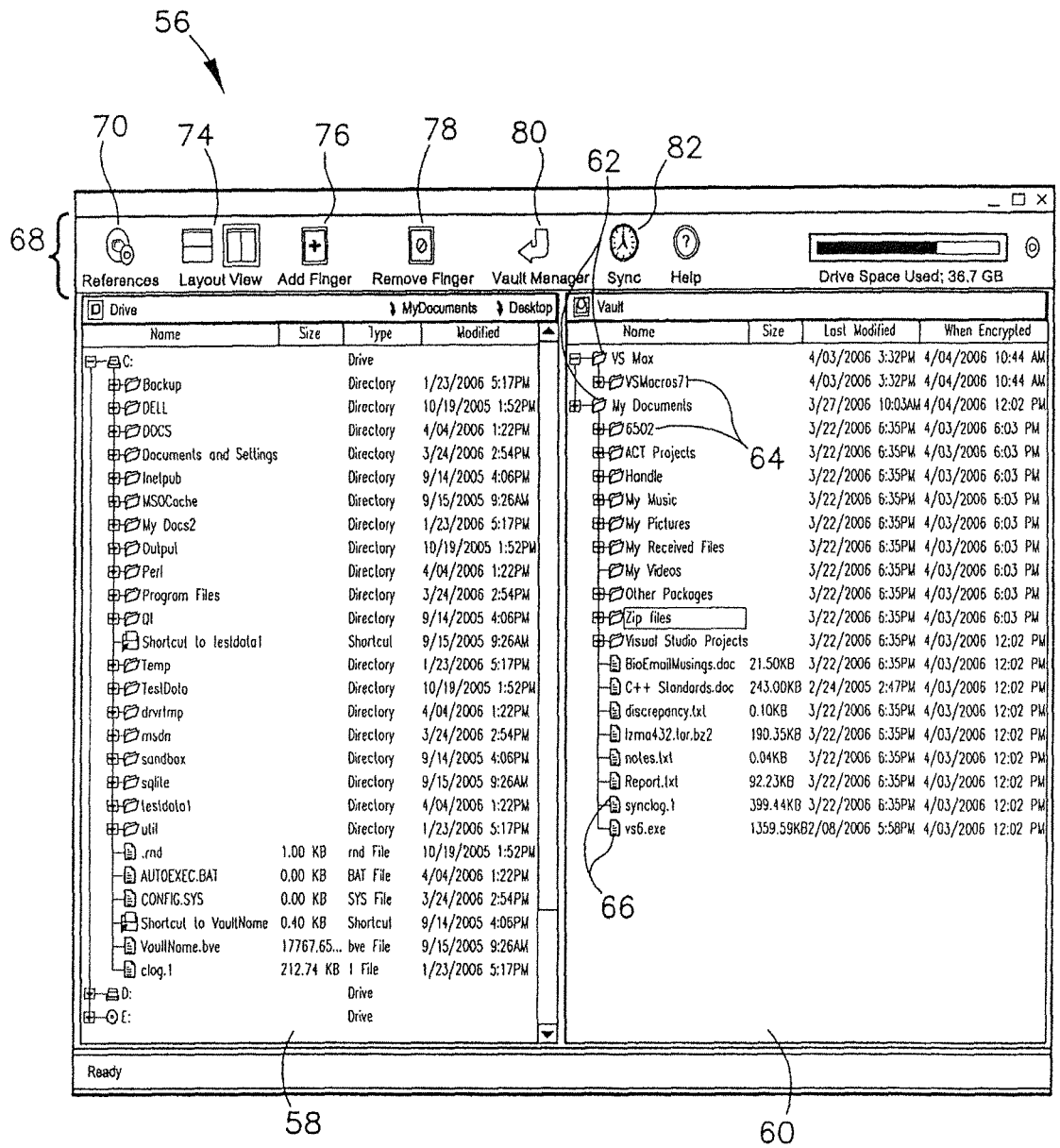
FIG. 3 is an exemplary user interface associated with the computer program for enabling the user to transfer files into and out of a secure repository.

An exemplary vault interface 56 is illustrated in FIG. 3. The interface 56 is a graphical user interface with various interface elements for managing the transfer of files into and out of the vault, as well as for managing interface preferences. The illustrated interface 56 presents a first window 58 and a second window 60. The first window 58 lists various drives, folders, sub-folders, and files stored on mediums generally accessible by the computer 10. The second window 60 lists various folders, sub-folders, and files stored in the vault.

To move a file into the vault, the user selects the file from the first window 58 and selects the second window 60 or a specific location within the second window 60. In response to the user selecting the file and selecting the second window 60, the program retrieves the selected file, encrypts the file using the encryption key created from the biometric data, and stores the encrypted file in the vault. Once the file has been stored in the vault, the program lists the file name in the second window 60, according to the location of the file relative to other files and folders in the vault.

The program is operable to encrypt and store the file in response to the user selecting the file and selecting the second window 60 and with no further action from the user, or with no other action by the user intermediate the acts of selecting the file and selecting the repository. By way of example, the user may select a file by positioning a display pointer over the file using a computer mouse, depressing a mouse button, dragging the file to the second window 60 by moving the mouse, and releasing the mouse button so that the file "drops" into the second window 60. The user sees the file copied or moved to the second window 60, but does not have to request or prompt the program to encrypt the file—the program automatically encrypts the file before storing it in the vault.

Alternatively, the program may encrypt and store the file in response to the user selecting the file, selecting the repository, and performing only minimal additional action, such as responding to a confirmation request generated by the program. Such minimal additional action may include one or more user actions but does not substantially extend the time or effort required by the user beyond that required by the act of selecting the file and selecting the repository.

To move a file from the vault to a storage location external to the vault, the user selects a file listed in the second window 60 and selects a location listed in the first window 58. In response to the user selecting the file and selecting the location, the program decrypts the file and stores it at the user-selected location.

The program is operable to decrypt and store the file in the selected location in response to the user selecting the file and selecting the location and with no further action from the user, or with no other action by the user intermediate the acts of selecting the file and selecting the location. By way of example, the user may select a file from the second window 60 by positioning a display pointer over the file using a computer mouse, depressing a mouse button, dragging the file to a particular location listed in the first window 58 by moving the mouse, and releasing the mouse button so that the file "drops" into the location listed in first window 58. The user sees the file copied or moved to the first window 58, but does not have to request or prompt the program to decrypt the file—the program automatically decrypts the file before storing it at the selected location.

Alternatively, the program may decrypt and store the file in response to the user selecting the file, selecting the location, and performing only minimal additional action, such as responding to a confirmation request generated by the program. Such minimal additional action may include one or more user actions but does not substantially extend the time or effort required by the user beyond that required by the act of selecting the file and selecting the target location.

The program is also operable to move file folders into and out of the vault in the manner described above, wherein a folder contains one or more files, subfolders, or both. When moving folders into the vault, the program retains the folder/subfolder/file structure by encrypting each file separately from other files stored in the folder, creating folders and subfolders in the vault corresponding to the folders and subfolders selected by the user, and storing the encrypted files in the folders and subfolders of the vault according to the original structure of the selected files. Once a folder has been created in the vault the user can place files into the folder, including files moved into the vault from an external location and files already stored in the vault but not in the folder. Furthermore, with one or more folders in the vault, as illustrated in the second window 60 of the interface 56, the user may place a file in the vault by selecting the second window 60 generally or by selecting a particular location within the second window 60.

As illustrated in FIG. 3, the second window 60 illustrates a plurality of folders 62, subfolders 64, and files 66 stored in the secured vault. Folders listed in the second window 60 may be expanded to reveal subfolders and files contained therein, and may be condensed to hide the subfolders and files. If a user selects a folder from the first window 58 and moves the folder into the vault, the folder will appear in the second window 60 substantially identically as it appeared in the first window 58, including the subfolder/file structure.

The program enables users to access files directly from the second window 60 of the vault interface 56. In other words, users can view or launch encrypted files listed in the second window 60 without first requesting that the program decrypt the files. By way of example, if the user positions a display pointer over the file labeled "notes.txt" in the second window 60 using a computer mouse and double clicks a mouse button, the program responds by automatically decrypting the file, launching an external application that is compatible with the file (such as a text editor), and displaying the file in a user interface generated by the application. If the user selects an executable file in a similar manner, the program automatically decrypts the executable file and executes code associated with the file.

The vault interface 56 includes a toolbar 68 with various icons representing selectable functions associated with the vault. Selecting a preferences icon 70 invokes a preferences window 102 illustrated in FIG. 7 and described below in greater detail.

Figure 4:
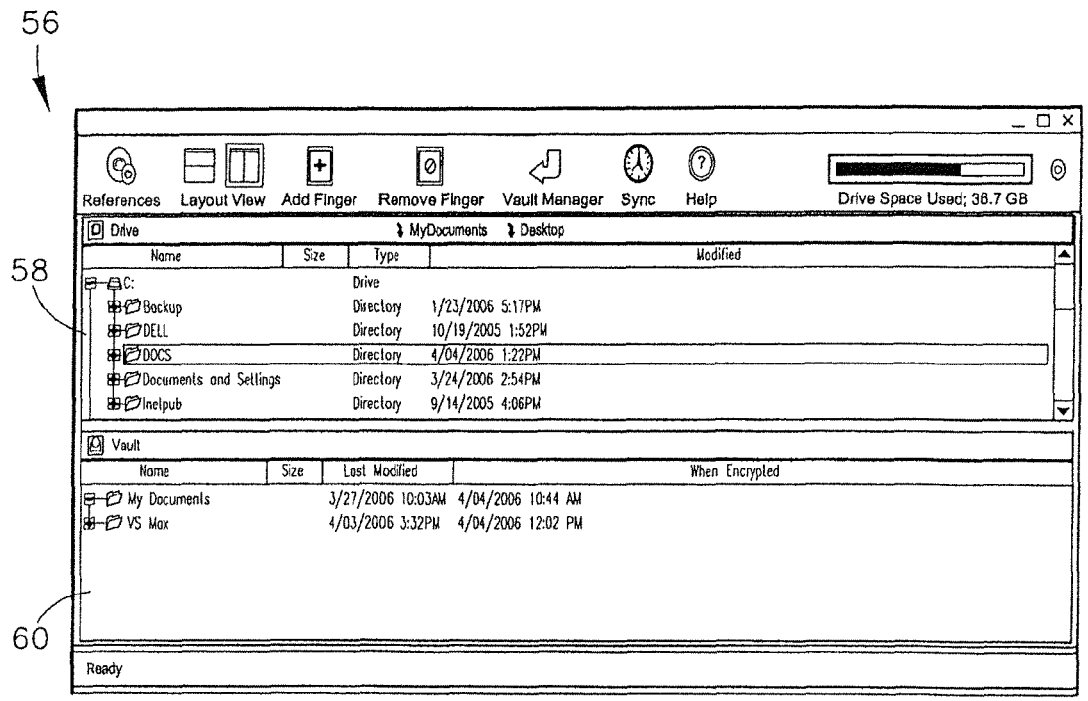
FIG. 4 illustrates an alternative layout of the user interface of FIG. 3.

Selecting a layout view icon 74 modifies the manner in which the program presents information contained in the first window 58 and the second window 60. The vault interface 56 may toggle between a vertical layout view (FIG. 3) and a horizontal layout view (FIG. 4), wherein the horizontal layout view presents the first window 58 above the second window 60.

Selecting an add finger icon 76 causes the program to enroll secondary biometric data, including the steps of receiving the data from a user and associating the data with the vault, as explained above. Selecting a remove finger icon 78 causes the program to disassociate secondary biometric data from the vault so that the user associated with the biometric data is no longer granted access to the vault. When a user selects the remove finger icon 78, the program prompts the user associated with the biometric data to be removed to submit anew the biometric data, thus preventing a first user from disassociating a second user's biometric data from the vault without the second user's consent.

Selecting a vault manager icon 80 causes the program to present a vault manager interface illustrated in FIG. 8 and discussed below. Selecting a sync icon 82 presents a synchronization manager interface 84 illustrated in FIG. 5. The synchronization manager interface 84 enables the user to set up and manage synchronization pairs. Synchronization involves comparing the contents of two folders and updating the contents of either or both folders so that each folder contains the most recent version of each file contained in the other folder.

More specifically, a synchronization pair consists of two folders, a first folder that is inside the vault called the vault folder, and a second folder that is outside the vault called the host computer folder. The program synchronizes the two folders by first updating the host computer folder. It does this by determining which files in the vault folder do not exist in the host computer folder, decrypting those files, and placing a copy of each decrypted file in the host computer folder. The program then compares the ages of the files in the vault folder with the ages of matching files in the host computer folder and replaces older files in the host computer folder with matching newer files in the vault folder. The program then updates the vault folder in the way it updated the host computer folder, except that files that are moved from the host computer folder to the vault folder are encrypted.

Figures 6, 7:
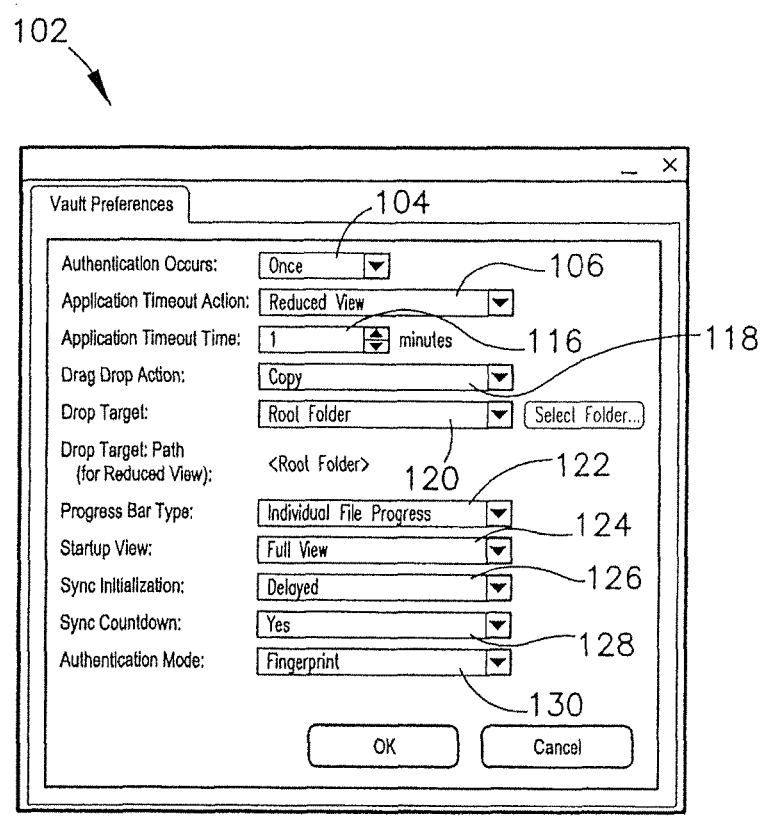
FIG. 6 is an exemplary list of folder pairs whose contents are synchronized by the synchronization function of the computer program.
FIG. 7 is an exemplary user interface associated with the computer program for enabling a user to select various preferences associated with the secure repository.

A group of synchronization pairs is illustrated in FIG. 6. A first pair named "FlashPics" includes a folder labeled "MyPics" stored on a flash drive; a second pair named "LaptopPics" includes a folder labeled "MyPics" stored on a laptop computer hard drive; and a third pair named "NetworkPics" includes a folder labeled "MyPics" stored on a network drive. Synchronization occurs alphabetically according to pair name. For example, files in the flash drive folder "MyPics" are first synchronized with files in the vault folder "FlashPics." Then, files in the laptop folder "MyPics" are synchronized with files in the vault folder "LaptopPics." Finally, files in the network drive folder "MyPics" are synchronized with files in the vault folder "NetworkPics."

The synchronization manager interface 84 includes an add button 86 for creating a synchronization pair; a remove button 88 for deleting a synchronization pair; a rename button 90 for renaming a synchronization pair; an enable button 92 for enabling a synchronization pair that was previously disabled; and a disable button 94 for disabling a synchronization pair. When a synchronization pair is disabled, the program retains an association between the folders of the pair but does not synchronize the contents of the folders. When a user selects the enable button 92, the program begins performing synchronization of the folders.

A synchronization pair window 96 presents a list of existing synchronization pairs. Automatic synchronization on/off radio buttons 98 enable a user to turn automatic synchronization on and off, and a time interval selector 100 enables the user to select a time interval between each automatic synchronization. Such intervals may be one minute, two minutes, five minutes, ten minutes, fifteen minutes, twenty minutes, thirty minutes, sixty minutes, or virtually any other time interval expressed in seconds, minutes, hours, days, etcetera.

The program identifies a particular drive associated with each host computer folder to ensure that the program can distinguish between host computer folders that have the same path name. This may arise, for example, where a user has a folder on a work computer with the path "c:\pics" and a folder on a home computer with the same path name, and has created a synchronization pair involving the "pics" folder on the home computer. The program identifies the drive on the home computer containing the "pics" folder according to a drive serial number and a drive volume label, which are different than the serial number and volume label of the drive on the work computer. Thus, the program does not synchronize a folder pair unless it can verify that the drive associated with a host computer folder is the same drive that was associated with the host computer folder when the synchronization pair was created.

An exemplary vault preferences interface 102 is illustrated in FIG. 7 and enables users to change various program settings. A first drop-down menu 104 enables the user to determine how often the program requires user authentication. Authentication includes submitting biometric data via the biometric data sensor so that the computer can verify that the submitted biometric data corresponds to enrolled biometric data. Options available via the menu 104 may include "once" and "always." If "once" is selected, the program requires authentication only when the vault is opened, if "always" is selected, the program requires authentication each time a user attempts to perform an action in or to the vault, including adding an item to the vault, removing an item from the vault, enrolling secondary biometric data, and changing preferences.

A second drop-down menu 106 provides options associated with actions the program takes upon the occurrence of a timeout. Timeout occurs when a predetermined time has passed during which no user has interacted with the program. Options available via the menu 106 may include "reduced view," "exit the application," and "none." The "reduced view" setting will cause the program to go into a reduced view mode, which involves generating an icon that is generally smaller in size than other user interfaces associated with the program. The "exit the application" setting will cause the program to exit upon occurrence of timeout. Selecting the "none" option essentially disables timeout.

Figure 9:
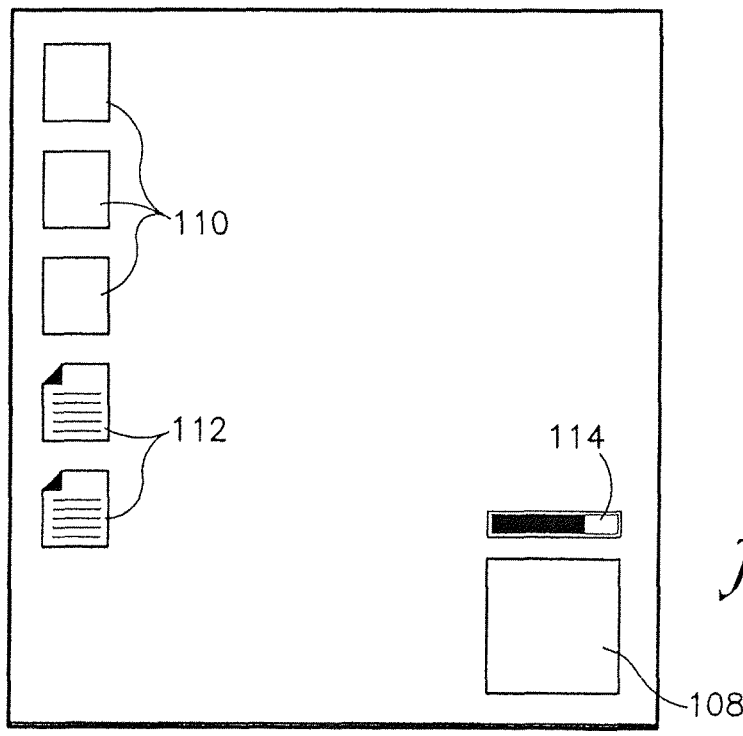
FIG. 9 is an exemplary graphical user interface of a computer operating environment including an icon associated with the secure repository.

An exemplary reduced view icon 108 is illustrated in FIG. 9, wherein the icon 108 is illustrated as part of an interface associated with a computer operating environment that also displays one or more icons 110 associated with executable program code as well as one or more icons 112 associated with files or file folders. A progress bar 114 may also be associated with the icon 108 and indicate, for example, a percentage completion of an encryption or decryption process.

In a particular implementation, the program generates an icon for a WINDOWS™ desktop interface. In the reduced view, users can drag files from a location external to the program icon, such as from the WINDOWS™ desktop or from the WINDOWS EXPLORER™ program, to the program icon, wherein the program encrypts the files and stores them in the vault.

A third drop-down menu 116 enables users to determine the length of time that passes without interaction from the user before timeout occurs. The options available via the menu 116 include one, two, three, four, five, ten, fifteen, twenty, twenty-five, thirty, forty-five, and sixty minutes. These values are exemplary in nature and virtually any length of time may be included in the drop-down menu 116.

A fourth drop-down menu 118 provides drag-and-drop action options. These options include "copy," "move," and "prompt." When the "copy" option is selected, dragging and dropping a file into or out of a vaults copies the file so that the original remains. When the "move" option is selected, dragging and dropping a file into or out of a vault moves the file so that the original is deleted. When the "prompt" option is selected, the program prompts the user to select copy or move each time the user uses the drag and drop function.

A fifth drop-down menu 120 provides drag and drop target options associated with the reduced view and includes "root" and "select" options. When the "root" option is selected, the program places files in the root (top level) of the vault. When the "select" option is selected, the program allows the user to select a particular folder or subfolder in the vault as the target folder.

A sixth drop-down menu 122 enables users to select a type of progress bar used in the vault interface 56. The progress bar associated with the vault interface 56 provides an indication of task progress in a conventional manner. Such tasks may include encryption, decryption, deletion, import, export, and so forth. Options provided in the drop-down menu 122 include "individual file progress" and "total file progress." When the "individual file progress" option is selected the program provides an indication of the progress of each file individually via the progress bar. This is used, for example, where a user selects a folder with multiple files, or selects multiple files. When the "total file progress" option is selected, the program provides an indication of the progress of the entire group of files.

A seventh drop-down menu 124 provides options relating to the type of user interface the program presents at startup. The options provided by the drop-down menu 124 include "reduced view" and "full view." A reduced view icon 108 is illustrated in FIG. 9, as explained above. The full view is either the vault manager interface (FIG. 8) or the vault interface 56, depending on whether the program discovers a preexisting vault at startup.

An eighth drop-down menu 126 provides synchronization options including "disabled," "delayed," and "immediate." When the "disabled" option is selected, synchronization never initiates automatically but must be manually started by a user. When the "delayed" option is selected, synchronization occurs automatically a pre-determined time period after startup. When the "immediate" option is selected, the program automatically synchronizes all folder pairs immediately upon startup.

A ninth drop-down menu 128 enables users to determine whether a visible countdown will precede a synchronization. A tenth drop-down menu 130 provides authentication mode options. When a "fingerprint" option is selected, the program requires a fingerprint only to authenticate a user. When a "password" option is selected, the program requires a password only to authenticate. When a "fingerprint or password" option is selected, the program requires a fingerprint or password to authenticate. When a "fingerprint and password" option is selected, the program requires both a fingerprint and a password to authenticate a user.

Figure 8:
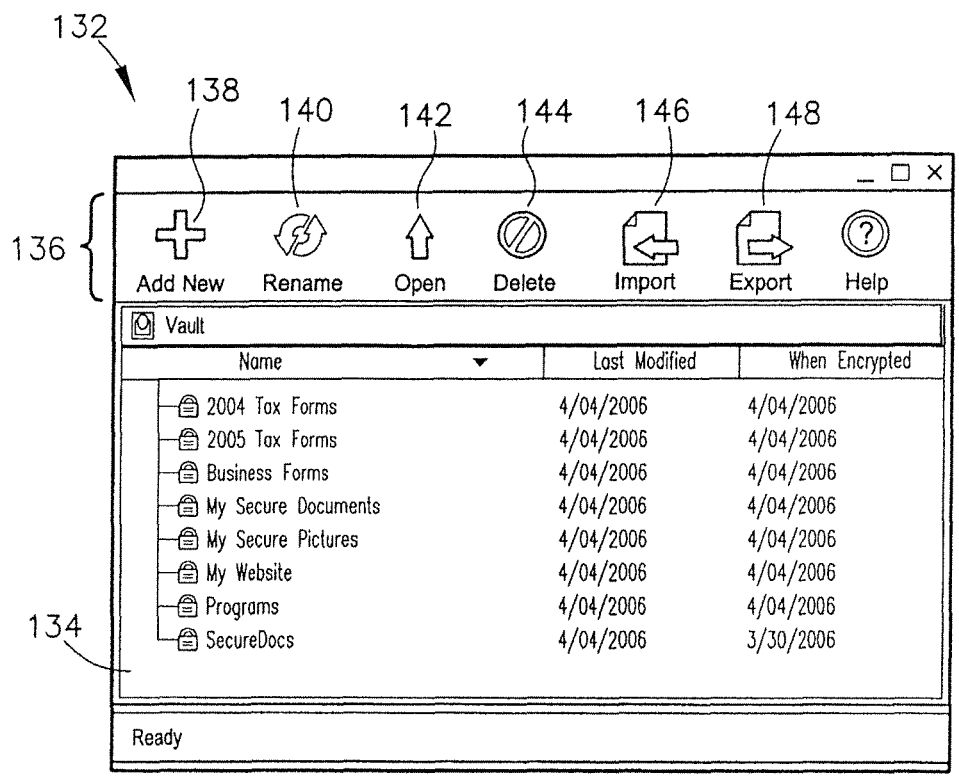
FIG. 8 is an exemplary user interface associated with the computer program for enabling a user to manage a plurality of secure repositories.

An exemplary vault manager interface 132 is illustrated in FIG. 8. The vault manager interface 132 presents a list 134 of vaults and a toolbar 136 for managing the vaults. An add button 138 enables the user to create a new vault. When the user selects the add button 138 the program enrolls primary biometric data, receives a name of the vault, and creates a vault associated with the primary biometric data, as explained above. The new vault is then presented in the list 134. The user may create as many new vaults as he or she wishes.

A rename button 140 enables the user to rename an existing vault, the program may require authentication for this action. An open button 142 enables the user to open a vault selected from the list 134 of vaults in order to view and manage the contents of the vault. The program requires the user to submit biometric data before opening the vault, and only opens the vault if the submitted biometric data matches the primary biometric data or secondary biometric data. A delete button 144 enables the user to delete a selected vault, and the program may require authentication before performing the delete operation, and may prompt the user to confirm his or her desire to delete the vault. Alternatively, the program may require the user to submit a password in addition to or in lieu of the biometric data before opening a vault.

An import button 146 enables the user to associate an existing vault with the vault manager interface 132, such as where the vault was previously exported. When a user selects the import button 146, the program presents a list of drives and folders from which the user may select an exported vault. An export button 148 enables the user to save a copy of a vault included in the list 134. The user first selects a vault from the list 134, then selects the export button 148, and selects an export location in a conventional manner via, for example, a list of storage locations generated by the program. When the user selects the vault and the location, the program creates a copy of the vault and stores the copy in the designated location. The original vault remains accessible to the user via the vault manager interface 132.

As explained below in the subsection titled "Apparatus for Interfacing with a Restricted Access Computer," the program may be stored entirely on, and may be executed from, the external storage device 18 with built-in biometric sensor 36 without the need to install the program on the computer 10. The device 18 may be connected to the computer 10 via an interface supporting a "hot-swapable" connection standard, such as the Universal Serial Bus (USB), wherein the drive 18 may be connected to and removed from the computer 10 while the computer 10 is running. Furthermore, each vault associated with the program may be stored on the external hard drive 18, so that the program, biometric sensor 36, and encrypted data are bound in a single package that can be moved from a first computer 10 to a second computer 22 simply by unplugging the drive 18 from the first computer 10 and plugging it into the second computer 22. Alternatively, the program and associated vaults may be stored entirely on an internal storage device of the computer 10.

The user may be allowed to choose from various options at the time of purchase of the program, during use of the program, or both. For example, the user may choose a type of encryption to be used by the program including, for example, AES256, Blowfish 448, and 3DES, among others. Furthermore, the user may be allowed to choose what type of information, if any, the program requires before granting access to a secure repository. The user may set up the program to require biometric data only, a password only, either biometric data or a password, or both biometric data and a password.

When the program is set up to require only a password, the program generates or uses an artificial biometric template, as explained above, and creates an encryption key in a manner similar to that explained above using the biometric data. When using only a password to authenticate a user, however, the program may supplement the artificial biometric template with information taken or derived from the password. The program may authenticate the password by comparing the password with a copy of the password stored in a database before granting access to the secure repository.

Although the program has been described with reference to the preferred embodiments illustrated in the attached drawings, it is noted that equivalents may be employed and substitutions made herein without departing from the scope of the invention as recited in the claims. It will be appreciated, for example, that invention may be implemented entirely on a portable wireless device 32, such as a laptop or notebook computer, or a handheld device approximately the size of a user's hand such as a wireless telephone, portable digital assistant, or similar device, wherein the device includes an attachable or built-in biometric data sensor 34.

Apparatus for Interfacing with a Restricted Access Computer

The computer program described above for implementing the system and method of transparently encrypting and decrypting data via a biometrically secure process may be stored on any computer-useable medium. In one embodiment, the program is stored in a portable device with a built-in biometric sensor, wherein the portable device is configured for use in a restricted computing environment.

Figure 11:
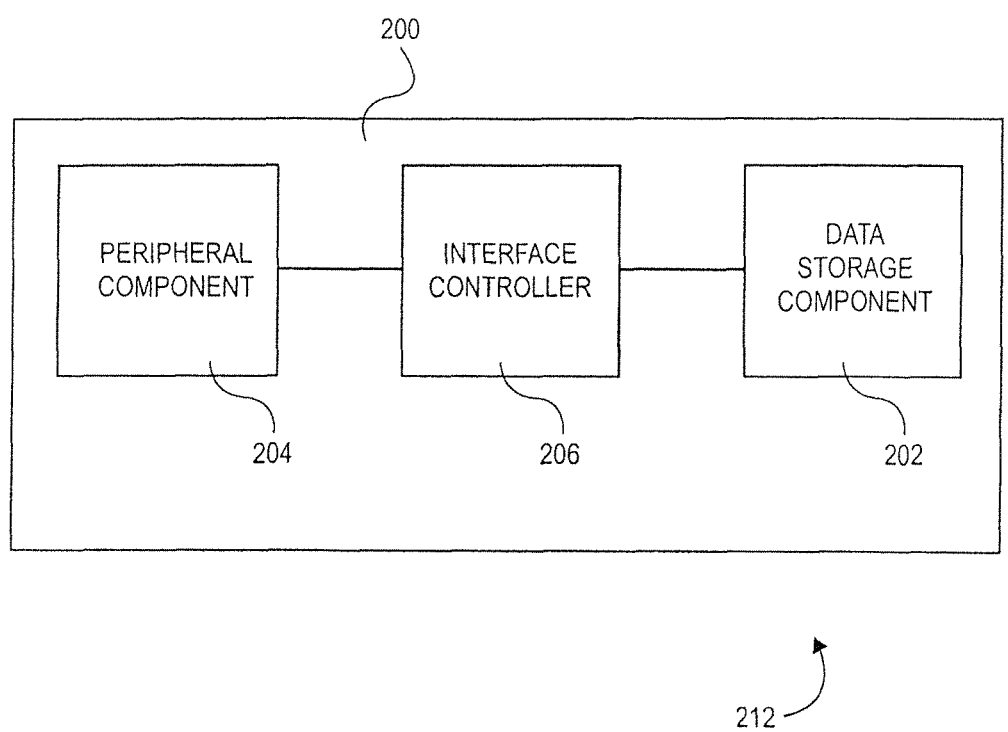
FIG. 11 is a block diagram of various components of the apparatus of FIG. 10.

A device for interfacing with a restricted access computer is illustrated in FIG. 10 and designated generally by the reference numeral 200. The illustrated device 200 is an external computer hard drive generally comprising a data storage component 202, a peripheral component 204, an interface controller 206, an interface communication medium 208, and an enclosure 210. FIG. 11 presents a block diagram 212 illustrating interaction between the data storage component 202, the peripheral component 204, and the interface controller 206 of the device 200. The device 200 is configured to operate with a host computer, as explained below. The device 200 will be described as operating with host computer 10 (FIG. 1).

The data storage component 202 of the device 200 receives and stores data from the host computer 10, and retrieves data to communicate to the host computer 10. The data storage component 202 operates in a substantially conventional manner and therefore will not be described in detail. The data storage component 202 stores the computer program of the present invention, including the computer program described above in the subsection titled "Secure Storage System." Program data stored on the data storage component 202 includes, for example, database files, encrypted files, executable files, library files, and setting and preference files. The computer program is configured to be automatically discoverable by the host computer 10 and executable by the host computer 10 from the device 200. In other words, the host computer 10 "finds" the computer program stored on the data storage component 202 following protocols defined by an operating system running on the computer 10. The computer 10 executes the program without installing the program on the host computer 10.

By way of example, if the host computer 10 is running the WINDOWS™ operating system, the operating system will automatically detect the presence of the device 200 when the device 200 is connected to the computer 10. Upon detecting the device 200, the operating system determines whether the device 200 includes files to be automatically executed, such as by running one or more files identified in an "autorun.inf" file stored in the data storage component 202. The host computer 10 then executes an executable file identified by the "autorun.inf" file. The program code executed by the computer 10 enables the computer 10 to access and interact with databases, libraries, settings and preferences, and other files stored on the device 200 such that none of these files need to be installed on the computer 10.

The peripheral component 204 interacts with the host computer 10 (via the interface controller 206, as explained below) by communicating data to the host computer 10, receiving data from the host computer 10, or both. In a first embodiment, the peripheral component 204 includes one or more user interface elements that receive input information from a user for communicating to the other components of the device 200, to the host computer 10, or both. Such user interface elements may also receive output data from other components of the device 200, from the host computer 10, or both, and present the output data to the user. Alternatively, the user interface component 204 may only receive input information from the user or may only present output data to the user. The user interface elements may include, for example, a biometric sensor, such as a fingerprint scanner. However, the present teachings contemplate virtually any peripheral component and are not limited to interface components.

The interface controller 206 enables communication between the data storage component 202 and the host computer 10, and between the peripheral component 204 and the host computer 10. The interface controller 206 also communicates data to the host computer 10 that identifies the device 200 to enable the host computer 10 to interact with the device 200. For example, the interface controller 206 may communicate data to the computer 10 enabling the computer 10 to identify a device driver compatible with the apparatus 200 that is already installed on the computer 10.

The device 200 is preferably a portable device adapted to be connected to and removed from the host computer 10 "on the fly," that is, without turning off or otherwise preparing the host computer 10. configured for plug-in-play use with a computer, such as the computer 10 or the computer 22. Because it is designed for plug-in-play, it can be used with multiple different computers. The device 200 is configured for use with a restricted access computing computer. Restricted access computers prevent users from installing or removing software unless the users have special privileges, such as administrative privileges. Installation requires the computer's operating system to change settings, which is prohibited in the restricted access environment. Settings of the WINDOWS™ operating system may include, for example, modifying registry "keys," saving files to the "Windows" folder or the "Windows23" folder, and so forth.

The registry is a database used by the operating system to store configuration information. The WINDOWS™ operating system registry includes various major sections, such as the "HKEY_Local_Machine" section, which includes settings for hardware, the operating system, and installed applications; the "HKEY_Classes_Root" section, which includes file associations (linking a certain type of file to a specific application) and object linking an embedding (OLE) information; and the "HKEY_Current_User" section, which includes preferences set for current user. Installing software on the computer 10 may affect one or more of these (or other) sections of the registry. Software installation may require modification of one or more of these sections of the registry, which is prohibited in a restricted environment if the user does not have the proper privileges.

Based on the identification information received from the interface controller 206, the computer 10 can determine whether the software necessary to interact with the device 200 is available to the computer 10. If the computer 10 needs a particular driver to interact with the peripheral component 204, for example, the identification information communicated to the computer 10 from the interface controller 206 would so indicate to the computer 10. The computer 10 could then determine whether the driver has been installed on the computer 10.

The interface controller 206 preferably communicates data to the host computer 10 indicating to the computer 10 that the computer 10 is operable to interact with the device 200 using software already installed on the computer 10, even if such software is not installed on the computer 10. This may be done, for example, by including data identifying the device 200 as a device for which the computer 10 has driver software built-in. The WINDOWS™ operating system, for example, recognizes universal serial bus (USB) mass storage devices and communicates with them via the "USBstore.sys" set of libraries. Thus, the interface controller 206 preferably communicates data to the computer 10 via a USB interface of the computer 10 indicating to the computer 10 that the device 200 is a mass storage USB device. The computer 10 then uses device drivers available on the computer 10 to communicate with the device 200. Because the computer 10 does not attempt to acquire or install new software to interact with the device 200, it will interact with the device 200 even if it is running in a restricted mode requiring, for example, administrative privileges to install new software.

Thus, although the computer 10 needs to use the computer program stored on the data storage component 202 to interact with one or more components of the device 200, such as the peripheral component 204, the computer 10 communicates with the device 200 using a generic mass storage device protocol, wherein the data communicated to the device 200 includes data for both the peripheral component 204 and the data storage component 202. The interface controller 206 is configured to distinguish between data intended for the peripheral component 204 and data intended for the data storage component 202, and to direct the incoming data accordingly.

Similarly, the interface controller 206 receives data from the peripheral component 204 and the data storage component 202 and communicates the data to the host computer 10 via the USB interface using the generic mass storage device protocol. The computer program stored on the data storage component 202 and executed by the host computer 10 enables the computer to identify various portions of the data communicated from the device 200, such as data from the peripheral component 204 and data from the data storage component 202.

The computer program stored on the data storage component 202 may generate the graphical user interface using only data from the data storage component 202 and without invoking any utilities of the operating system running on the computer 10. This self-sufficient feature of the computer program further ensures compatibility with restricted computing environments that may prevent access to such utilities.

Although the invention has been described with reference to the preferred embodiments illustrated in the attached drawings, it is noted that equivalents may be employed and substitutions made herein without departing from the scope of the invention as recited in the claims. For example, the device 200 may interface with the computer 10 via an IEEE 1394 ("Firewire") port, or other serial or parallel data communications interface.

Having thus described a preferred embodiment of the invention, what is claimed as new and desired to be protected by Letters Patent includes the following:

1. A non-transitory computer-readable storage medium with an executable program stored thereon for enabling a secure storage system for storage of first and second data items, wherein the first and second data items are associated with information associated with a security template of a user for authentication of the user's identity, wherein the program instructs at least one processor to perform the following steps:
   receive an instruction from the user to transfer a one of the first and second data items to or from the secure storage system;
   receive information associated with an authentication template of the user to access the one of the first and second data items during a session;
   compare the information associated with the authentication template with the information associated with the security template and information associated with one or more secondary templates;
   upon the information associated with the authentication template correlating with the information associated with the security template, generate a key corresponding to said one of the first and second data items to be transferred,
   wherein the first data item corresponds to a first key, the second data item corresponds to a second key, and the first key is different than the second key;
   if the received instruction is to transfer the one of the first and second data items to the secure storage system, encrypt the one of the first and second data items using said generated key and store the one of the first and second data items in the secure storage system; and
   if the received instruction is to transfer the one of the first and second data items from the secure storage system, decrypt the one of the first and second data items using said generated key and remove the one of the first and second data items from the secure storage system.

2. The medium of claim 1, wherein the information associated with the authentication template of the user is biometric information.

3. The medium of claim 2, wherein the information associated with the authentication template of the user is fingerprint information.

4. The medium of claim 2, wherein the information associated with the authentication template of the user is facial characteristic information.

5. The medium of claim 1, wherein the information associated with the authentication template of the user includes biometric information and password information.

6. The medium of claim 1, wherein the generated key is an AES256 key.

7. A method of enabling secure storage of a plurality of user data items on device including a storage medium, comprising the steps of:
   receiving a request, from a user, to access the device;
   enabling the user to provide biometric information associated with the user in order to be granted access to the device;
   receiving, from the user, the biometric information associated with the user;
   generating, from the biometric information associated with the user, an authentication template for the user;
   comparing information associated with the authentication template for the user with information associated with a security template stored on the device and information associated with one or more secondary templates stored on the device;
   determining that the authentication template for the user corresponds to the security template stored on the device;
   providing access, in response to the determination, to the storage medium;
   receiving a request to access a user data item of the plurality of user data items on the storage medium; and
   decrypting, using a data item key accessible if the authentication template for the user corresponds to the security template stored on the device, the user data item,
   wherein each user data item of the plurality of user data items has a different data item key.

8. The method of claim 7, wherein the biometric information associated with the user is fingerprint information.

9. The method of claim 8, wherein the device includes an integrated fingerprint scanner for receiving fingerprint information.

10. The medium of claim 7, wherein the biometric information associated with the user is facial characteristic information.

11. The method of claim 7, further comprising the step of discarding the biometric information associated with the user after generating the authentication template for the user.

12. The method of claim 7, further comprising the steps of:
   in response to the request from the user to access the device, providing the user with the option of authenticating via biometric data or password data;
   receiving, from the user, an indication that the user desires to authenticate via password;
   receiving, from the user, a password submission;
   determining that the password submission corresponds to a password template stored on the device;
   providing access, in response to the determination, to the storage medium; and
   decrypting, using a data item key accessible if the password submission corresponds to the password template stored on the device, the user data item.

13. The method of claim 12, wherein the data item key accessible if the password submission corresponds to the password template stored on the device is the same as the data item key accessible if the authentication template for the user corresponds to the security template stored on the device.

14. A device storing encrypted user data, comprising:
   a fingerprint scanner;
   a processor; and
   a storage medium storing a plurality of encrypted user data items and one or more computer-executable instructions that, when executed, cause the processor to perform a method of controlling access to the encrypted user data comprising the steps of:
   receiving a request, from a user, to access the device;

enabling the user to either provide fingerprint information or password information to access the device;
receiving, from the user, fingerprint information of the user;
generating, from the fingerprint information, an authentication template for the user;
comparing information associated with the authentication template for the user with information associated with a security template stored on the device and information associated with one or more secondary templates stored on the device;
determining that the authentication template for the user corresponds to the security template stored on the device;
providing access, in response to the determination, to the storage medium;
receiving a request to access an encrypted user data item of the plurality of encrypted user data items on the storage medium; and
decrypting, using a data item key accessible if the authentication template for the user corresponds to the security template stored on the device, the encrypted user data item,
wherein each encrypted user data item of the plurality of user data items has a different data item key.

15. The device of claim 14, wherein the method further comprises the step of discarding the fingerprint information of the user after generating the authentication template for the user.

16. The device of claim 14, wherein the data item key accessible if the authentication template for the user corresponds to the security template stored on the device is stored on the storage medium in encrypted form.

17. The device of claim 14, wherein the plurality of encrypted user data items are stored on the storage medium in a file system comprising folders, sub-folders, and encrypted data files.

* * * * *